United States Patent [19]

Ravussin

[11] 4,222,265

[45] Sep. 16, 1980

[54] APPARATUS FOR AUTOMATICALLY MEASURING THE VERTICAL PROFILE OF THE TEMPERATURE IN THE ATMOSPHERE

[76] Inventor: Pierre E. Ravussin, Res. Grand Vue C, 1092 Belmont, Switzerland

[21] Appl. No.: 72,060

[22] Filed: Aug. 31, 1979

[30] Foreign Application Priority Data

Sep. 19, 1978 [CH] Switzerland .................. 9746/78

[51] Int. Cl.$^3$ .................. G01W 1/02; G01K 11/24
[52] U.S. Cl. .................. 73/170 R; 73/339 A; 343/5 W
[58] Field of Search ............ 73/170 R, 339 A, 339 C, 73/597; 343/5 W, 6 R

[56] References Cited
PUBLICATIONS

"Acoustic Radar Reads Wind Speed Remotely" from p. 16 of "Electronics", Dec. 22, 1961.

Primary Examiner—James J. Gill
Attorney, Agent, or Firm—Wender, Murase & White

[57] ABSTRACT

An apparatus for automatically measuring the vertical profile of the temperature in the atmosphere.

The temperature of the air is obtained by the measurement of the propagation speed of sound wave pulses, to which it is directly related, by means of a continuous Doppler radar.

The automation of the measurement is ensured by the automatic control of the radar emission frequency by the Doppler frequency which it receives, with reference to the frequency of the sonic emitter oscillator.

The apparatus presents a major advantage with respect to known methods in use for measurements of the lower layers of the atmosphere such as the meteorological towers and the sounding balloons due to its automatic functioning.

10 Claims, 8 Drawing Figures

APPARATUS FOR AUTOMATICALLY MEASURING THE VERTICAL PROFILE OF THE TEMPERATURE IN THE ATMOSPHERE

BACKGROUND OF THE INVENTION

The present invention concerns an apparatus for the automatic measurement at a distance of the vertical profile of the atmospheric temperature by means of a radioacoustic device.

Attempts have already been made for measuring the vertical profile of the temperature by means of the measurement of the propagation speed of sound in air, but without much success, because the means for putting into practice were not adapted to an automatic measurement.

In the field of the protection of the air space, the vertical profile of the temperature of the lower layers of the atmosphere is measured by means of a captive balloon carrying a temperature detector the information from which is transmitted by radio.

However, because of the slowness of the process and its cost, it cannot be put into practice when the wind becomes excessive, which very seriously limits its use.

SUMMARY OF THE INVENTION

The fact of being able to measure practically instantaneously and automatically the vertical profile of the wind, during any weather is a very big improvement with respect to method at present use, not only from the point of view of the technique but also of cost.

The apparatus for the automatic measurement at a distance of the vertical profile of the temperature, in accordance with the invention, is characterized by the fact that it comprises means to control the wavelength of the continuous Doppler radar used to measure the propagation speed of vertically emitted sound wave pulses, to the wavelength, variable with the temperature, of the said sound wave pulses; that the frequency of the sound wave is chosen such that a spatio-temporal average of the temperature in the test volume formed by the sound wave pulses is directly obtained, that said apparatus comprises complementary means for simultaneously measuring the vertical profile of the three-dimensional wind, and finally that it comprises means for correcting the carrying effect of the sonic waves by the vertical wind.

The present invention will be described further, by way of example, with reference to the accompanying drawings, in which:

BRIEF DESCRIBTION OF THE DRAWINGS

DESCRIPTION OF THE PREFERRED EMBODIMENT

The apparatus for the automatic measurement, at a distance, of the vertical profile of the atmospheric temperature is based on a property of gases, which determines that the propagation speed of sound in air depends only on the local air temperature and on the vertical speed of the wind.

$$V_s = 20.05\sqrt{T} + U, \text{ where} \quad (1)$$

$V_s$, speed of sound [m/s]
T, air temperature [°K.]
U, component of the air speed in the direction of sound propagation. [m/s]

Figure 1:
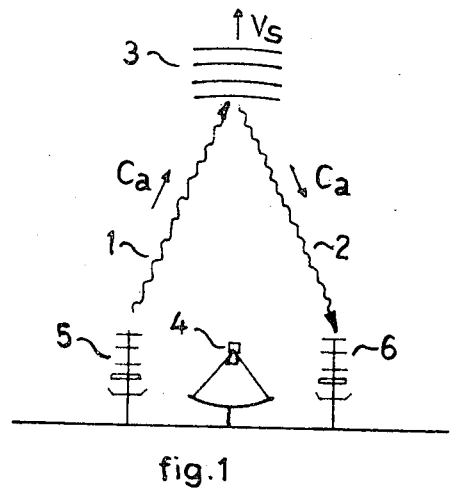
FIG. 1 shows the principle of a radioacoustic sounder.

The propagation speed of pulses of sonic waves of a power of several hundred watts is measured by means of a continuous Doppler radar (FIG. 1).

To obtain a useable radar echo 2, it is necessary that the length of the wave 1 emitted by the radar corresponds to double of the wavelength, variable with the temperature, of the pulses of sonic wave 3. The pulses of sonic waves 3 are emitted by an acoustic antenna 4, whilst the electromagnetic wave 1 of the radar is emitted by the antenna 5 and the echo 2 is collected by the antenna 6.

Figure 2:
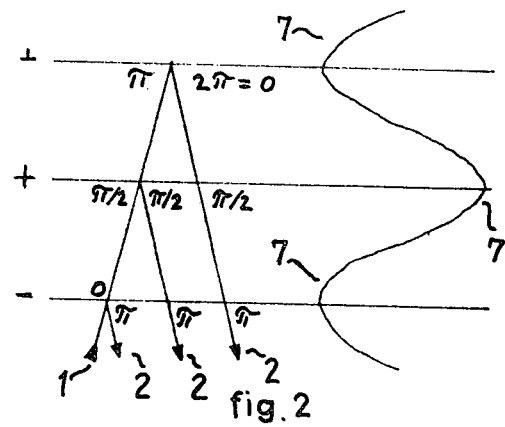
FIG. 2 illustrates the principle of reflection of the radar waves on the sound wave pulses.

FIG. 2 shows that the different radar echoes 2 reflected by the successive periods 7 of the pulses of sonic waves 3 are in phase (maximum echo) if the wavelength of the radar signal is double the wavelength of the acoustic signal $$\lambda_r = 2\lambda_s \quad (2)$$

The frequency of the Doppler radar echo is shifted with respect to the frequency of emission by a value given by the relation $$V_s/C_a = \Delta\nu/2\nu_o \quad (3)$$

where $C_a$ speed of light in air (constant)
$\nu_o$, frequency of radar emission
Knowing that the wavelengths are function of the frequencies by the relations $$C_a = \lambda_r \nu_o \quad (4)$$

$$V_s = \lambda_s \nu_s \quad (5)$$

it can be seen that the condition for obtaining maximum echo is that $$\Delta\nu = \nu_s \quad (6)$$

$\nu_s$ frequency of the pulses of sound waves.

Thus, if the relation (6) is satisfied, the Doppler frequency is equal to the frequency of emission of the sonic waves. It is this fact which serves as the physical basis of the present invention.

Figures 3, 4:
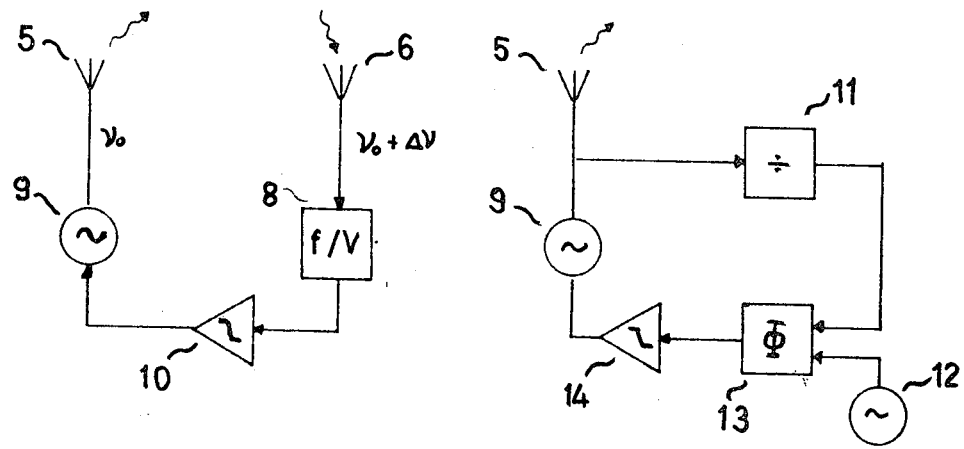
FIG. 3 shows the principle of control of the acoustic radar.
FIG. 4 shows the principle of a phase-locked loop oscillator.
Figure 5:
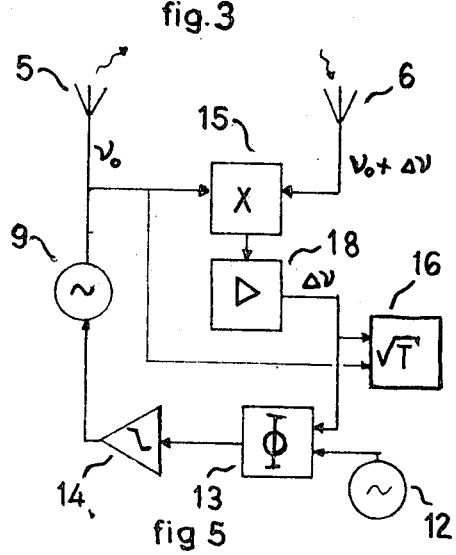
FIG. 5 shows the principle of control of the Doppler radar by the modified phase-locked loop system.

On the one hand, oscillators are known, the frequency of which vary with the control voltage and, on other hand, devices are known which transform a frequency into voltage. By combining (FIG. 3) a frequency/voltage converter 8 with such an oscillator 9 via an adaptation circuit (low pass filter) 10, control of the emission frequency of the radar by the atmospheric temperature is provided (disregarding the wind effect). The precision of the device is greatly improved by using a phase controlled device as a frequency/voltage converter which directly compares the Doppler frequency with the fixed frequency of the acoustic wave emitter oscillator. The original idea consists in replacing the divider 11 of the classical circuit (FIG. 4), of a phase-locked loop oscillator, which comprises a reference oscillator 12, a phase comparator 13, a low pass filter 14, a controlled oscillator 9, and the divider 11 by the Doppler radar itself (FIG. 5) symbolized by its emitting 5 and receiving 6 antennas and the mixer 15. The locking in of the control device is ensured by emitting, in a continuous and low power manner, a sonic signal before the emission of the main sonic pulse.

By combining the equations 1 to 5, it can be shown that the temperature is proportional to the square of the ratio between the Doppler frequency and the radar frequency.

$$T \sim V_s^2 \sim (\Delta \nu / \nu_0)^2 \tag{7}$$

Thus, the phase differences of the control system can be neglected by measuring the ratio directly by means of a ratio-meter 16.

The device thus gives an absolute measurement of the speed of the sound waves. An important point is the choice of the acoustic frequency (on which depends the radar frequency by the given relations). As for all measuring systems, it is the determination of the test volume which generates this choice. For measurements in the lower layers of the atmosphere a test volume having a side of the order of 10 m is the optimum.

To obtain a satisfactory radar echo by multiple reflection of the acoustic signal periods, it is necessary that the number thereof be about n=30. The acoustic frequency is then calculated by the relation $$\nu_s = (n/l)V_s \tag{8}$$

That is a sonic frequency of the order of 1000 Hz (for example 1600 Hz).

An indispensible complement of the measuring system is the vertical wind measurement u, the effect of which is not negligible. To this end, the acoustic antenna 4 of FIG. 1 receives the sonic wave diffused by the atmospheric turbulence during the passage of the sonic wave pulses 2. One has in fact the following relation (Doppler effect).

$$U/V_s = \Delta \nu_s / 2\nu_s \tag{9}$$

$\Delta \nu_s$ Doppler frequency of the sonic signal.

Numerous attempts have been made to determine this frequency by means of spectrum analysers, but this method is poorly adapted to the test volume.

An optimum spatio-temporal average is effected by measuring the time $t_p$ for the n periods of the sonic wave pulses to cross the test volume (for example n=30) by means of a period meter which measures $t_p$, preceded by frequency divider (division by m). The Doppler frequency $\Delta \nu_s$ is calculated then by the relation $$\Delta \nu_s = m/t_p \tag{10}$$

Figure 6:
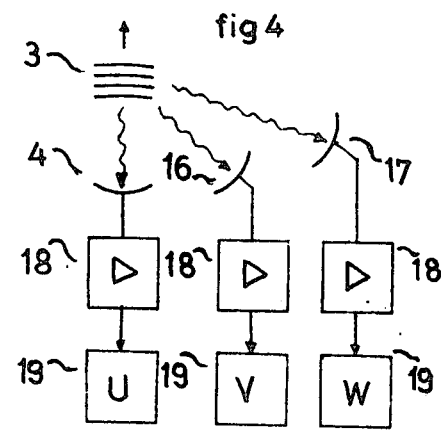
FIG. 6 shows the principle of measuring the wind in three dimensions.

The measurement of the vertical profile of the vertical wind can be easily extended (FIG. 6) to the measurement of the vertical profile of the three dimensional wind in adding two acoustic antennas placed at a predetermined distance (for example 150 m from the vertical antenna), followed by signal conditioners 18 comprising a divider by m and period meters 19. It is to be noted that these signal conditioners 18 are the same as the Doppler radar conditioner signals, as they work at the same frequency.

Figure 7:
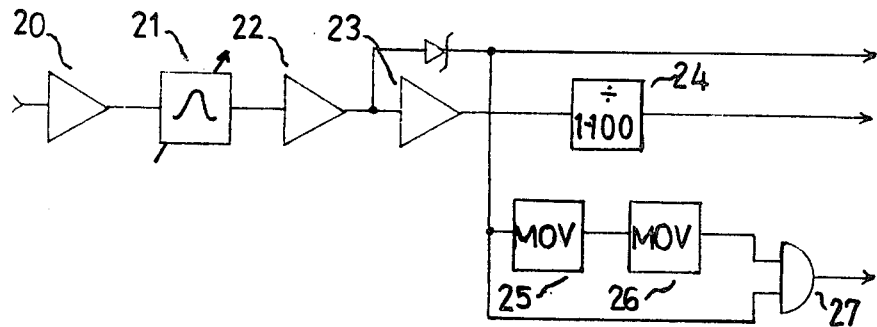
FIG. 7 shows a possible method for the tranformation of the electrical signals of the signalling conditioner.

They comprise (FIG. 7) a low noise preamplifier 20, an adjustable bandwidth filter 21 centered on 1600 Hz, a logarithmic amplifier 27, a shaping circuit 23 and a division circuit 24 adjustable between 1 and 100. Moreover, the signal conditioner 18 comprises an error discriminating circuit which checks if the present signal is coherent.

It comprises two monovibrators 25 and 26 which generate a pulse, the coincidence of which with the signal to be controlled is detected by the comparator 27.

The measurements effected by the ratio meter and the three period meters are transmitted either to graphic registers, or to a miniordinator which transforms the measurements into physical data.

The height h of the measurement is determined by the integral $$h = \int_0^t \nu_\Delta dt \tag{11}$$

Figure 8:
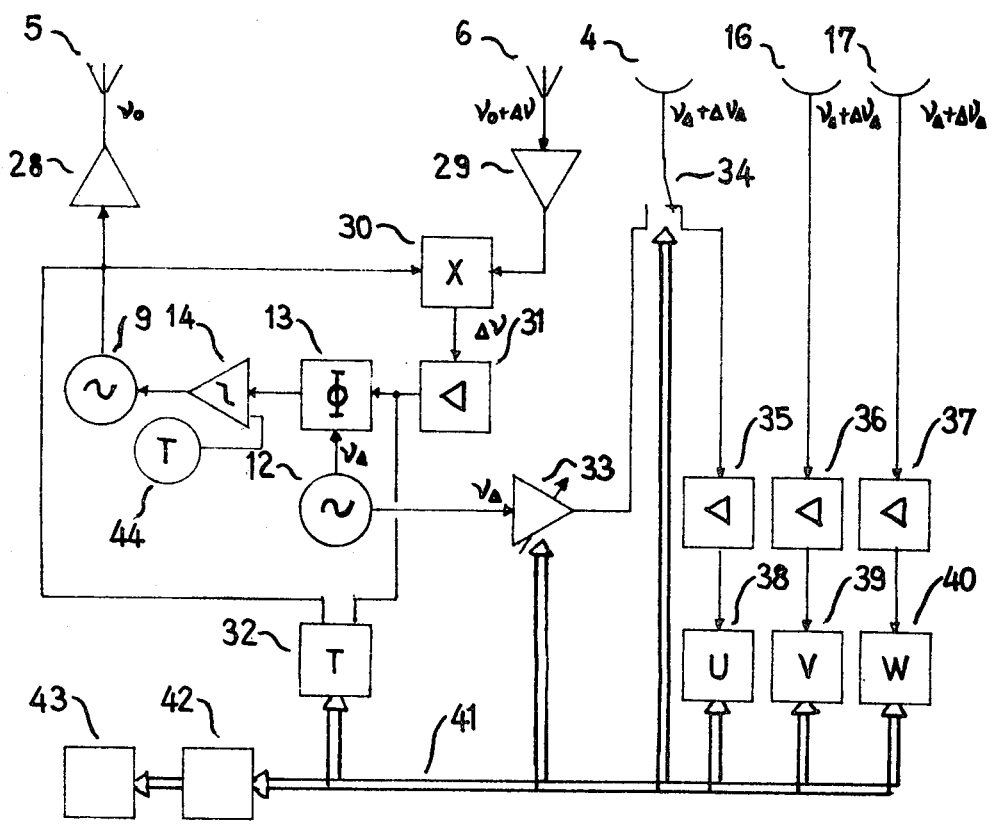
FIG. 8 shows a possible method for the transformation of the electrical signals of the apparatus.

One embodiment of the apparatus for the measurement at a distance of the vertical profile of the three-dimensinal wind is given by way of example in FIG. 8, in which the emitting antenna 5 is, energised by UHF power amplifier 28, driven by the UHF oscillator 12, the frequency of which is voltage adjustable between 650 MHz and 850 MHz. The adjustment voltage is provided by the phase detector 13 followed by the low pass filter 14. The signals delivered by the radar antenna 6, are amplified by the circuit 29, combined with the frequency of the emitter by the mixer 30. The resulting LF signal is treated by the conditioner 31, and is supplied to the phase detector 13. together with the 1600 Hz reference oscillator signal 12. The measuring system for the ground air temperature 44 gives an electric signal on the low-pass filter 14 which permits automatic adjustment of the emission frequency. The ratio of the frequencies is measured by the ratio meter 32.

The LF signals provided by the oscillator 12 are amplified by the circuit 33 (1000 W) and are supplied to the acoustic antenna 4 via a switch 34. At the receiving side, sonic signals, received by the acoustic antenna 4 as well as the acoustic antennae 16 and 17, are respectively treated by the period meters 38, 39 and 40, the outputs of which as well as that of the ratio meter 32 are connected by the normalized bus 41 to the miniordinator 42, which transmits the results to the terminal 43. Numerous variations are of course possible in the choice of the signal treating circuits.

What I claim:

1. An apparatus for the automatic measurement at a distance of the vertical profile of the atmospheric temperature comprising a controlled continuous Doppler radar which measures the speed of propagation of the sonic pulse, means for emitting said sonic pulse, means for correcting for the effect of the vertical speed of the wind and means for measuring said vertical speed of the wind.

2. An apparatus in accordance with claim 1, in which the length of the Doppler radar wave is controlled to be double the wavelength, variable with the temperature, of the sonic pulse.

3. An apparatus in accordance with claim 2, in which the control system comprises a phase detector between the Doppler radar frequency and the sonic pulse generating oscillator, followed by a low pass filter.

4. An apparatus in accordance with claim 2, including means for initially locking in the control system by emitting continuously a sonic signal at low power before the emission of the measurement sonic pulse.

5. An apparatus in accordance with claim 1, including a ratio meter which measures the ratio between the Doppler frequency received by the radar and the emission frequency of the radar.

6. An apparatus in accordance with claim 1, in which the measurement of the wind components is made by measuring the duration of n periods of the echo of the sonic pulse on the atmospheric turbulence.

7. An apparatus in accordance with claim 1, including a miniordinator which effects the correction of the carrying effect of the wind on the measurements.

8. An apparatus in accordance with claim 1, in which the sonic frequency is determined as a function of the dimensions of the test volume, as the product between the propagation speed of sound in air and the number n of periods necessary for the reflection of the radar wave (for example n=30), divided by the side of the test volume.

9. An apparatus in accordance with claim 1, in which the sonic pulse duration is equal to the ratio of the side of the test volume to the propagation speed of sound in air.

10. An apparatus in accordance with claim 1, including a control circuit which preregulates the emission frequency of the Doppler radar as a function of the ground air temperature.

* * * * *